(12) United States Patent
Panin et al.

(10) Patent No.: US 8,913,810 B2
(45) Date of Patent: Dec. 16, 2014

(54) SIMULTANEOUS RECONSTRUCTION OF EMISSION ACTIVITY AND ATTENUATION COEFFICIENT DISTRIBUTION FROM TOF DATA, ACQUIRED WITH EXTERNAL SHELL SOURCE

(75) Inventors: Vladimir Y. Panin, Knoxville, TN (US); Michael E. Casey, Louisville, TN (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 160 days.

(21) Appl. No.: 13/555,308

(22) Filed: Jul. 23, 2012

(65) Prior Publication Data

US 2013/0028496 A1    Jan. 31, 2013

Related U.S. Application Data (60) Provisional application No. 61/512,161, filed on Jul. 27, 2011, provisional application No. 61/511,575, filed on Jul. 26, 2011.

(51) Int. Cl.
*G06K 9/00* (2006.01)
*G06T 11/00* (2006.01)

(52) U.S. Cl.
CPC ................................ *G06T 11/003* (2013.01)
USPC .......................................... 382/128; 382/131

(58) Field of Classification Search
CPC ................. A61B 6/5235; G06T 2207/10104; G06T 2211/424; G06T 5/001; A61N 5/1039
USPC ................................................ 382/131, 128
See application file for complete search history.

(56) References Cited

U.S. PATENT DOCUMENTS

| | | | |
|---|---|---|---|
| 8,000,513 B2 * | 8/2011 | Defrise et al. | 382/132 |
| 2007/0221850 A1 * | 9/2007 | Panin et al. | 250/363.04 |
| 2009/0110256 A1 * | 4/2009 | Thielemans et al. | 382/131 |
| 2011/0158497 A1 * | 6/2011 | Schweizer et al. | 382/131 |
| 2012/0070057 A1 * | 3/2012 | Zhang et al. | 382/131 |

OTHER PUBLICATIONS

Nuyts et al. "Reducing Loss of Image Quality Because of the Attetuation Artifact in Uncorrected PET Whole-Body Images". 2002, J Nucl Med.*

* cited by examiner

*Primary Examiner* — Amir Alavi
*Assistant Examiner* — Kenny Cese
(74) *Attorney, Agent, or Firm* — Peter Kendall (57) ABSTRACT

Methods, and systems therefrom, for generating images from time of flight (TOF) data associated with a scan of at least one object using a positron emission tomography system are provided. The method includes providing initial values for an activity image to yield a current activity image. The method also includes estimating initial values for an attenuation map ($\mu$-map) image based on the TOF data to yield a current $\mu$-map image. The method further includes repeating, until at least one termination condition is met, the steps of updating the current activity image based on at least the current $\mu$-map and a first update algorithm and updating the current $\mu$-map image based on at least on the updated activity image and a second update algorithm. The method also includes outputting an image of the at least one object based on the current $\mu$-map and the current activity image.

20 Claims, 8 Drawing Sheets

SIMULTANEOUS RECONSTRUCTION OF EMISSION ACTIVITY AND ATTENUATION COEFFICIENT DISTRIBUTION FROM TOF DATA, ACQUIRED WITH EXTERNAL SHELL SOURCE

CROSS-REFERENCE TO RELATED APPLICATIONS

This application claims the benefit of U.S. Provisional Patent Application 61/512,161, filed on Jul. 27, 2011 and to U.S. Provisional Patent Application 61/511,575, filed on Jul. 26, 2011, the entire disclosures of which are hereby incorporated by reference.

FIELD OF THE INVENTION

The present invention relates to imaging base on positron emission tomography (PET), and more specifically to apparatus and methods for reconstruction with external nuclear transmission source in the case of PET imaging.

BACKGROUND

Medical radionuclide imaging, commonly referred to as nuclear medicine, is a unique specialty wherein ionizing radiation is used to acquire images which show the function and anatomy of organs, bones or tissues of the body. The technique of acquiring nuclear medicine images entails first introducing biologically appropriate radiopharmaceuticals into the body—typically by injection, inhalation, or ingestion. These radiopharmaceuticals are attracted to specific organs, bones or tissues of interest (These exemplary organs, bones, or tissues are also more generally referred to herein using the term "objects".). Upon arriving at their specified area of interest, the radiopharmaceuticals produce gamma photon emissions which emanate from the body and are then captured by a scintillation crystal. The interaction of the gamma photons with the scintillation crystal produces flashes of light which are referred to as "events." Events are detected by an array of photo detectors (such as photomultiplier tubes) and their spatial locations or positions are then calculated and stored. In this way, an image of the organ or tissue under study is created from detection of the distribution of the radioisotopes in the body. Known applications of nuclear medicine include: analysis of kidney function, imaging blood-flow and heart function, scanning lungs for respiratory performance, identification of gallbladder blockage, bone evaluation, determining the presence and/or spread of cancer, identification of bowel bleeding, evaluating brain activity, locating the presence of infection, and measuring thyroid function and activity. Hence, accurate detection is vital in such medical applications.

One particular nuclear medicine imaging technique is known as positron emission tomography, or PET. Positron emission tomography is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation. When a positron is annihilated by an electron, two 511 keV gamma photons are simultaneously produced and travel in approximately opposite directions. Gamma photons produced by an annihilation event can be detected by a pair of oppositely disposed radiation detectors capable of producing a signal in response to the interaction of the gamma photons with a scintillation crystal. Annihilation events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line(s)-of-response (LOR) along which the annihilation event has occurred.

After being sorted into parallel projections, the LOR defined by the coincidence events are used to reconstruct a three-dimensional distribution of the positron-emitting radionuclide within the patient. In two-dimensional PET, each 2D transverse section or "slice" of the radionuclide distribution is reconstructed independently of adjacent sections. In fully three-dimensional PET, the data are sorted into sets of LOR, where each set is parallel to a particular detector angle, and therefore represents a two dimensional parallel projection p(s, φ) of the three dimensional radionuclide distribution within the patient—where "s" corresponds to the distance of the LOR from the center of the detector and "φ" corresponds to the angle of the detector plane with respect to the x axis in (x, y) coordinate space (in other words, φ corresponds to a particular LOR direction).

Figure 1:
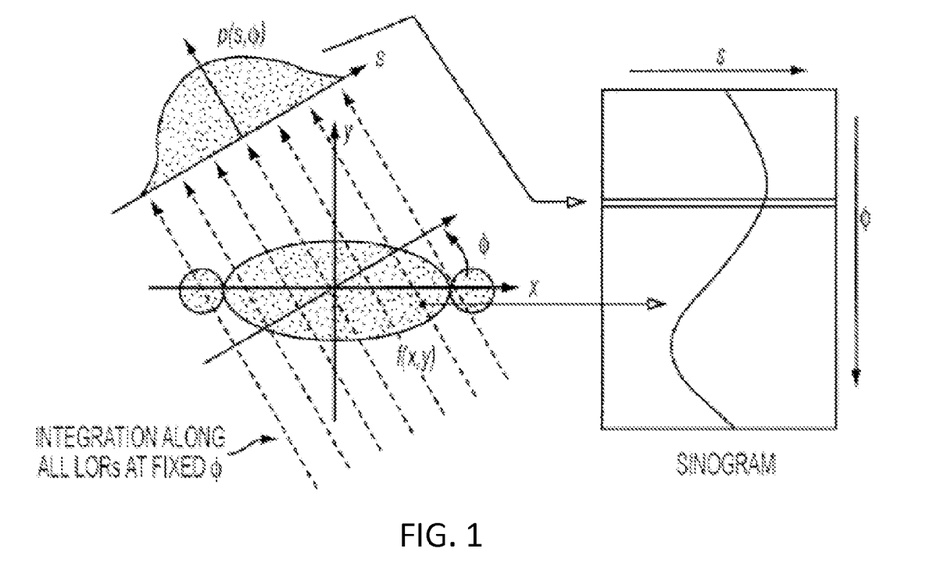
FIG. 1 is a diagram illustrating the relationship between PET projection data and a sinogram.

Coincidence events are integrated or collected for each LOR and stored in a sinogram. In this format, a single fixed point in f(x, y) traces a sinusoid in the sinogram. In each sinogram, there is one row containing the LOR for a particular azimuthal angle φ; each such row corresponds to a one-dimensional parallel projection of the tracer distribution at a different coordinate along the scanner axis. This is shown conceptually in FIG. 1.

An event is registered if both crystals detect an annihilation photon within a coincidence time window τ (e.g., on the order of 4-5 nsec), depending on the timing properties of the scintillator and the field of view (FOV). The FOV is defined as the volume between the detectors; and a pair of detectors is sensitive only to coincidence events occurring in the FOV. Therefore, the need for physical collimation is eliminated and sensitivity is significantly increased. Accurate corrections (for example, attenuation correction) can be made for the self-absorption of photons within the patient so that accurate measurements of tracer concentration can be made.

The number of time coincidences detected per second within a FOV of a detector is the count rate of the detector. The count rate at each of two oppositely disposed detectors, A and B, can be referred to as singles counts or SA and SB, respectively. The time required for a gamma photon to travel from its point of origin to a point of detection is referred to as the time-of-flight (TOF) of the gamma photon. TOF is dependent upon the speed of light c and the distance traveled. A time coincidence or coincidence event is identified if the time difference between the arrivals of signals in a pair of oppositely disposed detectors is within the coincidence time window τ. In conventional PET, the coincidence detection time window τ is wide enough so that an annihilation event occurring anywhere within the object will produce annihilation gamma photons reaching their respective detectors within the coincidence window. Coincidence time windows of 4.5-12 nsec are common for conventional PET, and are largely determined by the time resolution capabilities of the detectors and electronics.

Figure 2:
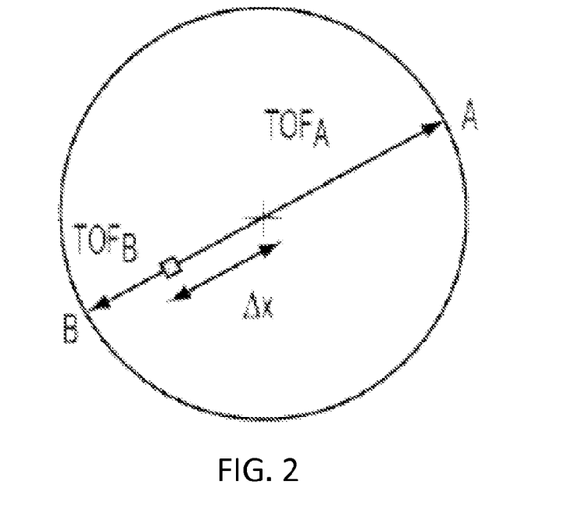
FIG. 2 is a diagram illustrating the concept of time of flight in PET imaging.

As illustrated in FIG. 2, if an annihilation event occurs at the midpoint of a LOR, the TOF of the gamma photon detected in detector A (TA) is equal to the TOF of the gamma photon detected in detector B (TB) If an annihilation event occurs at a distance Δx from the midpoint of the LOR, the difference between TA and TB is $\Delta t = 2\Delta x/c$, where c is the speed of light. If d is the distance between detectors, the TOF difference Δt could take any value from −d/c to +d/c, depending on the location of the annihilation event.

Time-of-flight (TOF) positron emission tomography (PET) ("TOF-PET") is based on the measurement of the difference Δt between the detection times of the two gamma photons arising from the positron annihilation event. This measurement allows the annihilation event to be localized along the LOR with a resolution of about 75-120 mm FWHM, assuming a time resolution of 500-800 ps (picoseconds). Though less accurate than the spatial resolution of the scanner, this approximate localization is effective in reducing the random coincidence rate and in improving both the stability of the reconstruction and the signal-to-noise ratio (SNR), especially when imaging large objects. Thus, in TOF-PET, the "TOF" coordinate, Δt, is stored together with s and φ.

There are various types of photosensors that are used or have been studied for use in PET scanners: most commercial systems today are based on photomultiplier tubes (PMTs), which detect the light emitted by a scintillator following a gamma event. Some recent systems and scanner prototypes have used avalanche photodiodes (APDs) to detect the light. Silicon photomultipliers (SiPMs) seem to be a promising sensor type for future detector generations, because they combine some advantages of PMTs (high signal gain and high speed) with those of APDs (small form factor and compatibility with magnetic fields). The output of the abovementioned sensors is normally an analog signal, where each gamma event leads to a complex signal shape. This shape results from the convolution of the time distribution of photon emission from the scintillator with the temporal response characteristic of the photosensor and possible further broadening by the front-end electronics.

Simultaneous emission (EM) and transmission (TX) data acquisition has a long history in PET scanner design. External positron emitter transmission sources, located outside the emission activity distribution, were exploited. The separation of transmission and emission data involves either dedicated TX detectors [1] or tracing the TX source position in sinogram space [2] during acquisition. With the help of a blank sinogram, acquired from the TX source in the absence of an object, the attenuation coefficients distribution (attenuation map or μ-map) can be reconstructed by iterative algorithm, modeling the TX data statistics [3, 4]. The reconstructed attenuation map is then used for attenuation correction and scatter distribution estimation in emission activity reconstruction. In this way, the reconstruction of two distributions is performed sequentially.

The simultaneous emission activity and attenuation map reconstruction in non-TOF PET was a topic of investigation for more than a decade [5, 6]. The main interest was to exclude the transmission sources completely in order to reduce hardware components. Both distributions were assumed to be reconstructed from a single emission data set. This so-called transmissionless (TX-less) problem has many solutions, even though it was shown that a significant amount of information about attenuation is contained in emission data. The artifact of cross-talking between activity and the attenuation images, when the activity image features propagate to attenuation map images and vice versa, was especially difficult to avoid. Therefore, some constraints on the attenuation distribution, such as partially known distribution and a priori known distribution values, must be used in an attempt to arrive at a proper solution.

The use of acquired TX data in simultaneous EM-TX reconstruction was also considered [7]. Here the main goal was improvement of attenuation map image quality, which suffers from significant noise in TX data alone.

Recent theoretical investigations [8] concluded that both activity and attenuation distributions can be determined from PET TOF data up to the emission image scaling parameter. This encourages TOF TX-less problem investigation in practice [9]. The stability of the solution will need more investigation. In addition to this, the attenuation sinogram cannot be determined outside of the emission sinogram support. Therefore, attenuation map reconstruction still requires a priori knowledge. In a recent TOF practical example [10], spatial attenuation distribution was assumed to be known from a segmented MRI scan. However, the MRI scan alone does not possess information about 511 keV photon attenuation values for a particular object region. Therefore, the MRI image region values were found by TOF simultaneous activity and attenuation reconstruction. This work also showed experimentally that cross talk artifacts, which were one of the sources of solution of non-uniqueness in non-TOF cases, were indeed significantly suppressed.

SUMMARY

Embodiments of the invention concern systems and methods for image reconstruction with external nuclear transmission source using TOF PET data. In a first embodiment of the invention, a method is provided for generating images from time of flight (TOF) data associated with a scan of at least one object using a positron emission tomography system. The method includes providing initial values for an activity image to yield a current activity image. The method also includes estimating initial values for an attenuation map (μ-map) image based on the TOF data to yield a current μ-map image. The method further includes repeating, until at least one termination condition is met, the steps of updating the current activity image based on at least the current μ-map and a first update algorithm and updating the current μ-map image based on at least on the updated activity image and a second update algorithm. The method also includes outputting an image of the at least one object based on the current μ-map and the current activity image.

In a second embodiment of the invention, an apparatus is provided for generating images from time of flight (TOF) data associated with a scan of at least one object using a positron emission tomography system. The apparatus includes a processor and a computer-readable medium having stored thereon instructions for causing the processor to perform various steps. These steps include providing initial values for an activity image to yield a current activity image. The steps also include estimating initial values for an attenuation map (μ-map) image based on the TOF data to yield a current μ-map image. The steps further include repeating, until at least one termination condition is met, an updating the current activity image based on at least the current μ-map and a first update algorithm and an updating the current μ-map image based on at least on the updated activity image and a second update algorithm. The steps also include outputting an image of the at least one object based on the current μ-map and the current activity image.

In a third embodiment of the invention, a computer-readable medium is provided, having stored thereon a computer program including a plurality of instructions for causing a computer program to perform a method. The method includes providing initial values for an activity image to yield a current activity image. The method also includes estimating initial values for an attenuation map (μ-map) image based on the TOF data to yield a current μ-map image. The method further includes repeating, until at least one termination condition is met, the steps of updating the current activity image based on at least the current μ-map and a first update algorithm and updating the current μ-map image based on at least on the updated activity image and a second update algorithm. The method also includes outputting an image of the at least one object based on the current μ-map and the current activity image.

DETAILED DESCRIPTION

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The various embodiments are directed to a new methodology, and systems therefrom, for simultaneous PET data reconstruction of emission activity and attenuation coefficient distribution. In the various embodiments, the attenuation coefficients image is constrained by use of an external rotating line source. This is an interesting problem on its own, since TOF TX and EM data can be distinguished in the time dimension, assuming that the TX source and emission activity are distant spatially [11, 12]. Therefore, the attenuation image can be reconstructed separately from the activity image. Nevertheless, separation of TOF EM and TX data is typically artificial.

In the various embodiments, simultaneous EM-TX reconstruction is provided in which contamination of emission data by the transmission source and vice versa is naturally modeled. The result of such simultaneous EM-TX reconstruction is improvement of the quality of the attenuation image, obtained by reconstruction from separated TX data. Here the TX data reconstruction attenuation map serves as the initial condition for simultaneous EM-TX reconstruction.

I. Methodology

Figure 3A:
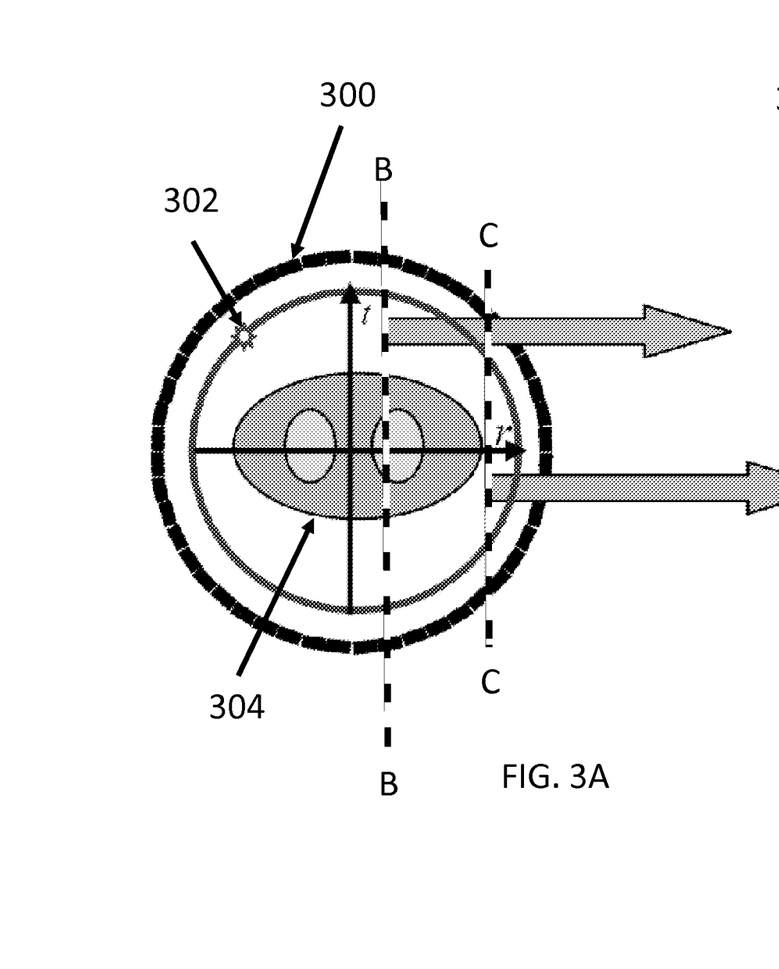
FIG. 3 is a schematic representation of simultaneous EM-TX acquisition.
Figure 3B:
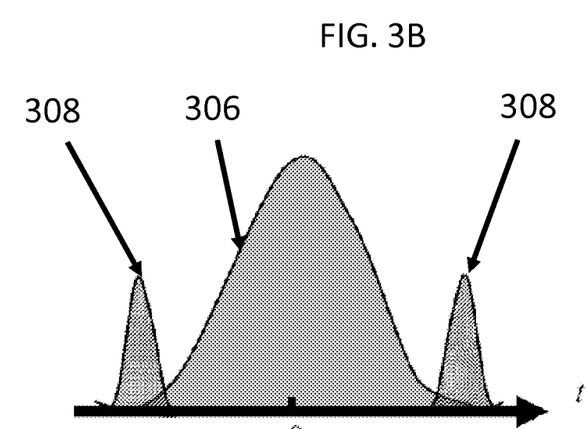
Figure 3C:
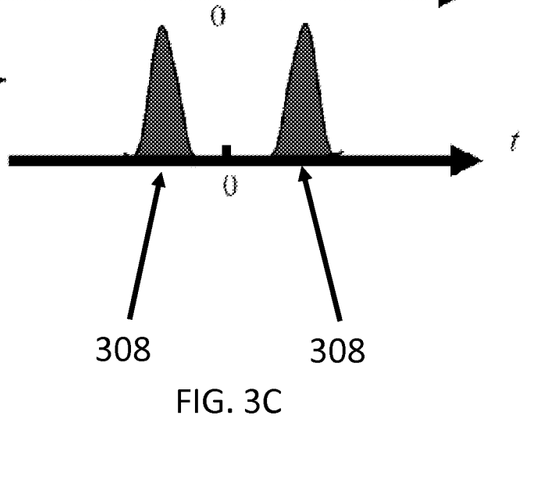

FIGS. 3A, 3B, and 3C are a schematic representation of simultaneous EM-TX acquisition. In FIG. 3A, circle 302 represents rotating TX line source placed inside mCT scanner 300 imaging an object 304. TX data 308 and EM data 306 can be separated by TOF information. FIG. 3B shows data for cutline B-B in FIG. 3A. FIG. 3C shows data for cutline C-C in FIG. 3A.

Coincidence data that originate from circle 302 are referenced as TX data. These data, emission in nature, are differentiated from EM data, originated from emission activity of the object of interest 304, in the sense that the TX image activity distribution is known. This distribution can be obtained from a blank scan, where an object is not present in the scanner FOV. Since the source position is not traced in projection space, the spatial activity of the TX source represents a shell after averaging over time. Note that the TX spatial distribution itself is not of interest, but rather the corresponding TOF blank projection data. In the various embodiments, blank data of extremely long acquisition time is used that is typical for PET TX imaging. One can assume that blank data are practically noiseless. Otherwise, TOF reconstruction can be performed on blank data in order to produce noise reduced modeled data. With EM data, neither object activity nor attenuation distributions are known before scanning.

A. Maximum a Posteriori (MAP) EM-TX Reconstruction of Attenuation and Activity Distribution TOF prompt data with a mean value p, spatial projection index i and TOF bin index t, can be modeled by combining object emission activity and TX source attenuated projections with various background count mean values:

$$\bar{p}_{i,t} = B_{i,t} e^{-\sum_j c_{ij} \mu_j} + e^{-\sum_j c_{ij} \mu_j} N_i^{-1} \sum_j C_{ij,t} f_j + \bar{r}_i + N_i^{-1} \bar{s}_{i,t}(f) + \bar{s}_{i,t}(B). \quad (1)$$

Here μ is the attenuation coefficient distribution (i.e., the attenuation map image) and f is the object emission activity image, indentified at image voxel with index j. B is blank projection data. $C_{ij}$ and $C_{ij,t}$ are system matrices of non-TOF and TOF line-integral projectors. We used the same geometrical model for both matrices. Mean random counts r are the same for any TOF bins. N is the normalization coefficient array. Scatter contribution was denoted as s with the origin source in parentheses. Scatter events can be originated from the object, denoted by f in parentheses, or from the TX source, denoted as B in parentheses. Scatter is not acquired but modeled and for this reason, emission activity scatter is de-normalized in (1). In general, scatter estimation is a function of the activity and attenuation map images. Nevertheless, during prompt data modeling (1) one can treat scatter values as constant values, obtained from the preprocessing step.

Both attenuation map and emission activity images can be estimated by maximizing the objective function:

$$L - \beta U = \sum_{i,t}(p_{i,t}\ln\overline{p}_{i,t} - \overline{p}_{i,t}) - \beta\sum_{j}\sum_{k\in N_j}(\mu_k - \mu_j)^2. \quad (2)$$

The first term L represents the Poisson Likelihood function to match modeled $\overline{p}$ and measured p TOF prompt data. The second term U represents a simple quadratic penalty (also called Gaussian prior) on attenuation map values. This simplest prior poses smoothing on the attenuation map image in order to reduce noise influence. In one embodiment, the six closest neighbors in the voxel j neighborhood $N_j$ are used in prior design. Regularization parameter β can be chosen using a trial and error approach or pre-defined for a particular data set.

The objective function (2) is optimized with respect to each spatial distribution individually. This resembles the group coordinate optimization algorithm. Therefore one can chose an alternative attenuation map and then an activity image update approach (similar to the non-TOF case of [6]), since optimization algorithms for each step are well known. For purposes of the discussion below, n denotes the iteration number of the algorithm.

In the optimization with respect to the attenuation map image, i.e., the attenuation step, one can use an update equation, derived similarly as described in [6]. The update equation represents a scaled gradient ascent algorithm, where a gradient of (2) can be recognized in the nominator:

$$\mu_j^{(n)} = \mu_j^{(n-1)} + \alpha \frac{\sum_i C_{ij}\left\{\sum_t B_{i,t}^{TX}A_i^{(n-1)}\left(1 - \frac{p_{i,t}}{B_{i,t}^{TX}A_i^{(n-1)} + \overline{b}_{i,t}^{TX}}\right)\right\} - \beta\frac{\partial U(\mu^{(n-1)})}{\partial \mu_j}}{D\sum_i C_{ij}\left\{\sum_t \frac{(B_{i,t}^{TX}A_i^{(n-1)})^2}{B_{i,t}^{TX}A_i^{(n-1)} + \overline{b}_{i,t}^{TX}}\right\} + \beta\frac{\partial^2 U(\mu^{(n-1)})}{\partial \mu_j^2}} \quad (3)$$

$$A_i^{(n-1)} = e^{-\sum_j C_{ij}\mu_j^{(n-1)}}, \quad B_{i,t}^{TX} = B_{i,t} + N_i^{-1}\sum_j C_{ij,t}f_j^{(n-1)},$$

$$\overline{b}_{i,t}^{TX} = \overline{r}_i + N_i^{-1}\overline{s}_{i,t}(f) + \overline{s}_{i,t}(B).$$

Here, α is the relaxation parameter to accelerate convergence (a value of 1.5 was used in particular embodiments), and D is the transaxial diameter of the reconstructed image support. The summation over the voxel j index is a forward projector operation in computing of attenuation factor $A_i$. The summation over projection index i is a backprojection operation. The system matrix of attenuation steps is non-TOF. Therefore, the data are summed over a TOF index before the backprojection operation. Non-TOF reconstruction is sensitive to activity-attenuation cross-talk artifacts. Therefore, one can expect that incorrect features in emission image, such as image noise, will propagate into the attenuation map image. The update equation (3) is an additive type, and nonnegativity constraint was not used in this work.

In the optimization of (2) with respect to the activity image, activity-step, a well known maximum likelihood-expectation maximization (ML-EM) algorithm was used, where the background counts b include both types of scatter and attenuated blank sinograms:

$$f_j^{(n)} = f_j^{(n-1)}\frac{\sum_{i,t}C_{ij,t}\frac{p_{i,t}}{\sum_{j'}C_{ij',t}f_{j'}^{(n-1)} + A_i^{(n)-1}N_i\overline{b}_{i,t}^{EM}}}{\sum_{i,t}C_{ij,t}A_i^{(n)}N_i^{-1}} \quad (4)$$

$$A_i^{(n)} = e^{-\sum_j C_{ij}\mu_j^{(n)}}, \quad \overline{b}_{i,t}^{EM} = \overline{r}_i + N_i^{-1}\overline{s}_{i,t}(f) + \overline{s}_{i,t}(B) + B_{i,t}A_i^{(n)}.$$

This optimization step is a TOF reconstruction, and it was shown to be less sensitive to attenuation map errors [10]. This step is likely the reason for suppression of cross-talk artifacts.

Each step uses simultaneous update algorithms. Two steps together however, represent the sequential update algorithm, so the most recent attenuation map should be used in the activity image update. In the various embodiments, Ordered Subsets [13] acceleration were used in both attenuation-steps and activity-steps. The corresponding notations have been omitted for ease of illustration.

B. Initial Condition for Attenuation Image: Reconstruction from Separated TX Data.

The initial condition is important in the EM-TX simultaneous reconstruction, since it greatly accelerates the algorithm convergence. Here TX data separation was used for the initial estimation of the attenuation map. This can be done if emission activity object and shell, representing rotating TX source, are spatially separated enough. First, one can assume the shell has radius R. Given radial coordinate LOR r (s in FIG. 1), LOR intersects TX rod circle at depth coordinate at two points $(r, \pm\sqrt{R^2 - r^2}) = (r \pm t_0)$ on FIG. 3A. Bilinear interpolation is then used between two adjacent TOF bins, which were closest to TOF value $t_0$. Therefore at most four TOF bins with the following indices contribute to separated TX sinogram:

$t = \text{floor}(t_0/\Delta t), w = 1 - (t_0/\Delta t - \text{floor}(t_0/\Delta t))$ $t = \text{floor}(t_0/\Delta t) + 1, w = t_0/\Delta t - \text{floor}(t_0/\Delta t)$ $t = -\text{floor}(t_0/\Delta t), w = 1 - (t_0/\Delta t - \text{floor}(t_0/\Delta t))$ $t = -\text{floor}(t_0/\Delta t) - 1, w = t_0/\Delta t - \text{floor}(t_0/\Delta t) \quad (5)$ Here $\Delta t$ is TOF bin width (312 ps) and w is weight factor of TOF bin contribution.

The non-TOF prompt and blanks data are obtained by:

$$p_i^{TX_{sep}} = \sum_t w_t p_{i,t} \quad (6)$$

$$B_i^{TX_{sep}} = \sum_t w_t B_{i,t}$$

The TX reconstruction by the algorithm, which is basically the same as the attenuation-step of the EM-TX reconstruction (except absence of emission activity and TOF data dimension) was performed using:

$$\mu_j^{(n)} = \mu_j^{(n-1)} + \alpha \frac{\left(1 - \frac{p_i^{TXsep}}{B_i^{TXsep} A_i^{(n-1)} + \bar{b}_i^{TXsep}}\right) - \beta \frac{\partial U(\mu^{(n-1)})}{\partial \mu_j}}{D \sum_i C_{ij} \frac{(B_i^{TXsep} A_i^{(n-1)})^2}{B_i^{TXsep} A_i^{(n-1)} + \bar{b}_i^{TXsep}} + \beta \frac{\partial^2 U(\mu^{(n-1)})}{\partial \mu_j^2}} \quad (7)$$

$$A_i^{(n-1)} = e^{-\sum_j C_{ij}\mu_j^{(n-1)}}$$

$$\bar{b}_i^{TX} = \bar{r}_i + \bar{s}_i(B).$$

TX scatter estimation previously drew little attention in non-TOF TX data reconstruction. The final "scatter corrected" μ-maps were typically obtained by scaling and segmenting the reconstructed image. However, in the various embodiments, the TX scatter component is estimated for the following use in EM-TX reconstruction. Single scatter simulations [15], adapted for TX imaging, can be used, for example.

Estimated non-TOF TX scatter was distributed into the TOF bins by fractions, defined by a blank sinogram distribution across TOF bins for a given spatial projection coordinate:

$$\bar{s}_{i,t}(B) = \bar{s}_i(B) \frac{B_{i,t}}{\sum_t B_{i,t}}. \quad (8)$$

This assumed that the TX scatter shape is TOF independent. One can expect this, since the scatter path will be only slightly longer compared to the path of the true events from spatially localized TX sources. Given the current TOF resolution and accepted photon energies, one can expect that the TX scatter will have similar TOF values. It also assumed that two TX sources in FIG. 2 will produce the same scatter shape. While scattering point physics indeed will be the same due to the same scattering angle, the attenuation of the scattered event is not exactly the same. This is due to the difference in attenuation coefficients values between different energy (scattered and non-scattered) photons. More detailed information about TOF distribution of scatter can be obtained by subtracting the attenuated TOF blank sinogram from the TOF TX sinogram. Nevertheless, an approximate TOF TX scatter estimation is sufficient for use in the various embodiments. Such TOF TX scatter estimation can then be used in EM-TX reconstruction for background counts modeling.

To separate EM data, one can simply subtract the attenuated blank sinogram and the TOF TX scatter from the whole data set. This can be expressed as $$p_i^{EMsep} = p_{i,t} - B_{i,t} e^{-\sum_j C_{ij}\mu_j^{(n-1)}} - \bar{s}_{i,t}(B). \quad (9)$$

A standard tool is then used to produce TOF EM scatter, which was used in EM-TX reconstruction. Note that separated TX and EM data, used to produce initial μ-map image and scatter estimations, are not of truly Poisson nature.

II. Results

Figure 4:
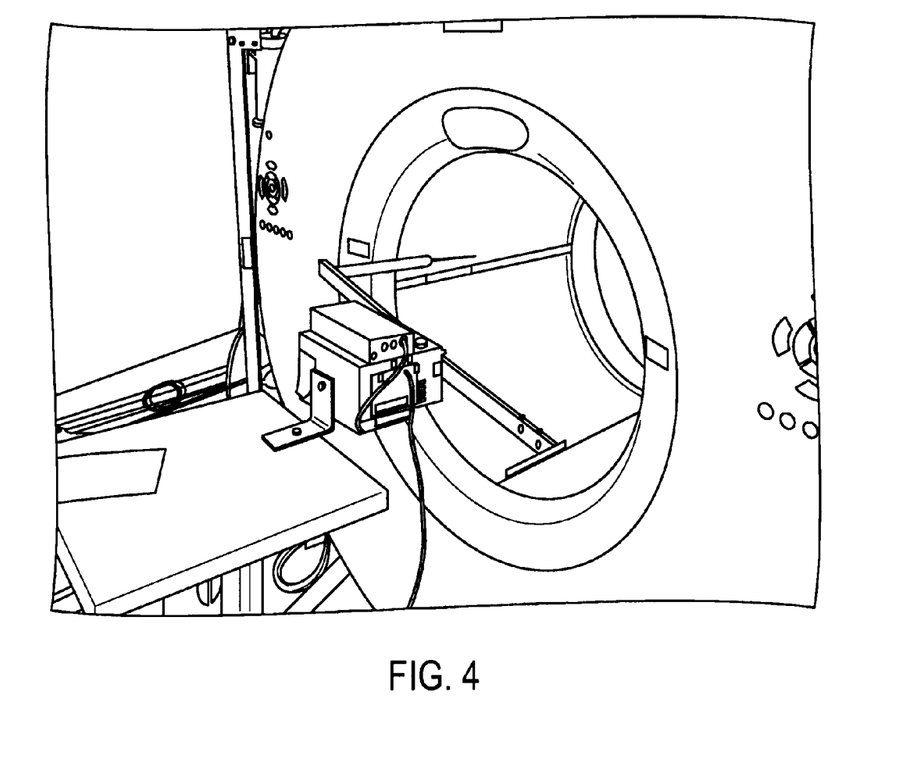
FIG. 4 shows a line source placement inside an mCT scanner.

The algorithm of the various embodiments was tested for data acquired on the a Siemens mCT scanner. A $^{68}$Ge rod of 18.5 MBq activity was placed into the scanner at a radial distance of 34 cm. This setup is illustrated in FIG. 4. The mCT scanner radius was about 42 cm. A blank scan was acquired for 10 hours. Then 10 hours of list mode file was acquired on one bed position with a 34 MBq $^{68}$Ge NEMA IQ phantom and two cylinders that represented cold (no activity) arms. The time window was about 6 ns. Presently the hardware allows the acquisition of 64 TOF bins of 78 ps width. In reconstruction, 15 TOF bins of 312 ps width (the mCT uses only 13 such TOF bins) were used. Fifteen TOF bins were not enough to accept all counts, which originated from the rotating rod source at the small radial sinogram coordinates. However, the blank scan properly modeled truncation in counts in the time direction in the TX data. mCT TOF resolution is 570 ps.

Since $^{68}$Ge phantoms with nominal activity were used, there was no way to balance the count amount between TX and EM data. As seen below, emission activity was too high for the information came from the EM data. Multiple TX sources can be used in practice to arrive at a proper balance.

The 10 hours list mode file was histogrammed into 3 data sets of 400(radial)×336(azimuthal)×621(axial)×15(TOF) sinograms of 10 hours, 30 mins and 3 mins duration. The separated 10 hours EM data contained 5×10$^9$ true events. It corresponded to 20 true Mcounts and 3 mins of data. Such a count level is typical for patient scans. The random fraction was 44% compared to total prompts. The separated 10 hours of TX data contained 7×10$^8$ true events in the object shadow. It was about only 3.6 true Mcounts in 3 mins of data.

The scatter estimations were made from 10 hours of data processing. Then these long duration data scatter estimations were properly scaled for use in shorter time acquisition data reconstruction. The 10 hours of random data were similarly processed. Since mean value random data should be used in statistical reconstruction, 10 hours of random data were considered as a good approximation of the mean. The mCT software uses a random smoothing technique for short duration acquisition.

Figure 5A:
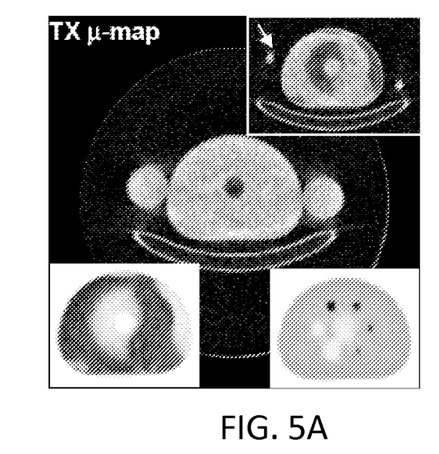
FIGS. 5A, 5B, and 5C show reconstructions for a high count data of 10 hours.
Figure 5B:
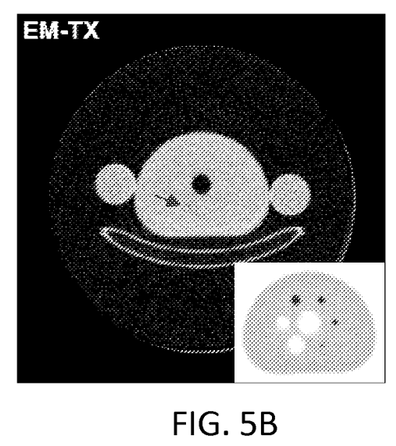
Figure 5C:
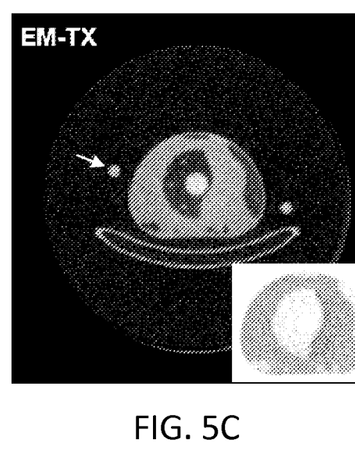
Figure 6A:
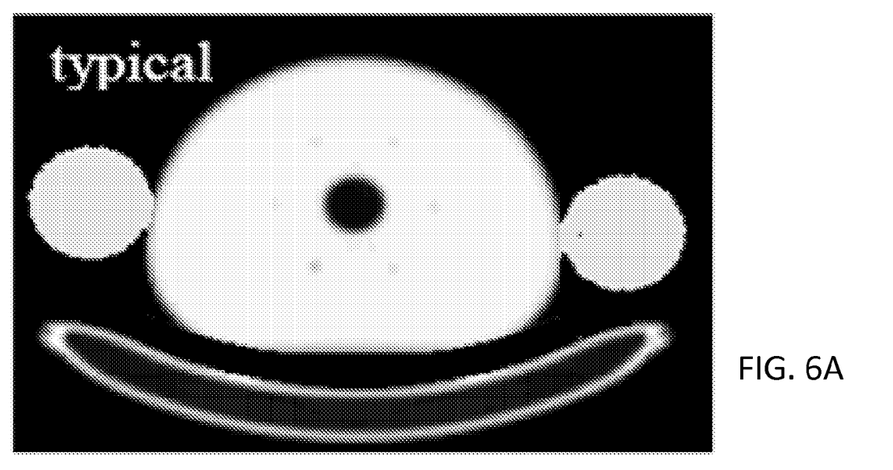
FIGS. 6A and 6B show μCT reference images.
Figure 6B:
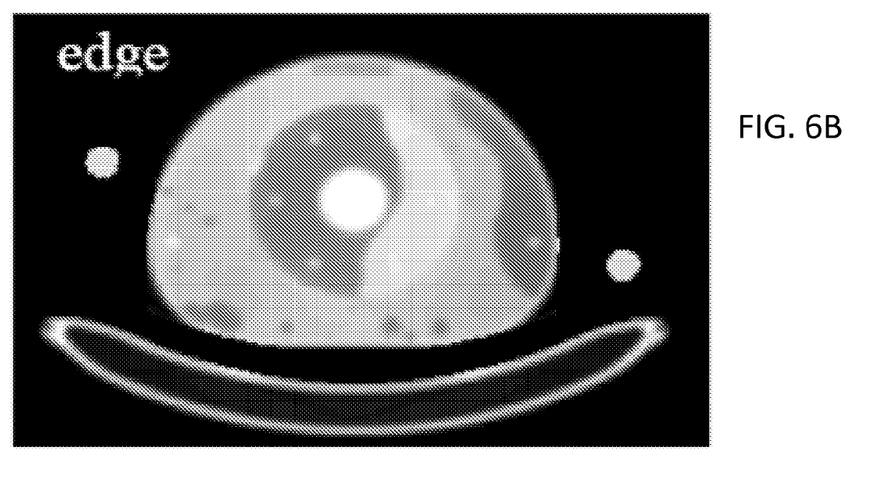

FIGS. 5A, 5B, and 5C show reconstructions for a high count data of 10 hours. FIG. 5A is a an initial attenuation map image. FIG. 5B, shows the activity and attenuation map images for the slice of FIG. 5A after processing in accordance with the various embodiments of the invention. FIG. 5C shows the activity and attenuation map images maps for a phantom edge slice, which contains small circular objects (cylinder plugs) after processing in accordance with the various embodiments of the invention. FIGS. 6A and 6B show attenuation map images of the above-mentioned slices using a CT scan for comparison.

Attenuation and activity images are shown for the different slices depending on the highlighted features of each image. Activity images are shown in smaller sizes and with inverted grayscale. The process began with the separated TX data image estimation (initial attenuation map, shown in FIG. 5A). Even when corrected for TX scatter, this initial attenuation map image showed residual values in the arms—in the direction of the main body. In addition to this, the cold spot in the center of the phantom was not completely recovered. Note that only one iteration of OSEM from the uniform initial condition was used to produce activity images corresponding to initial condition attenuation map. In these EM-TX reconstructions, 15 iterations and 24 subsets were used to produce presented activity and attenuation map images, unless otherwise noted. When EM data contributed to the attenuation map reconstruction, the attenuation map image values were significantly (and correctly) reduced around the arms and in cold spots. Uniformity of the attenuation map image (especially in the arms region) was also significantly improved, as shown in FIG. 5B. The whole phantom attenuation values were correct. The detectability in the attenuation map image was also significantly improved. The arrow points to the real structure of the phantom, where there is empty space between the sphere and its holder. This feature is presented in the CT scan (as shown in FIGS. 6A and 6B), but was not visible in the separate TX data reconstruction. Most importantly, the above-mentioned attenuation map image improvements led to improvements in the activity image, such as better uniformity.

Figure 7A:
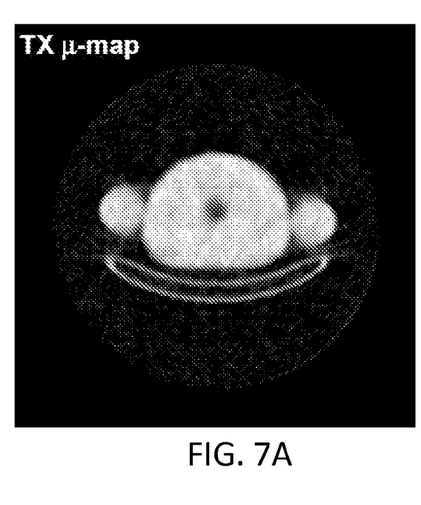
FIGS. 7A and 7B show reconstructions for 30 minute acquisitions.
Figure 7B:
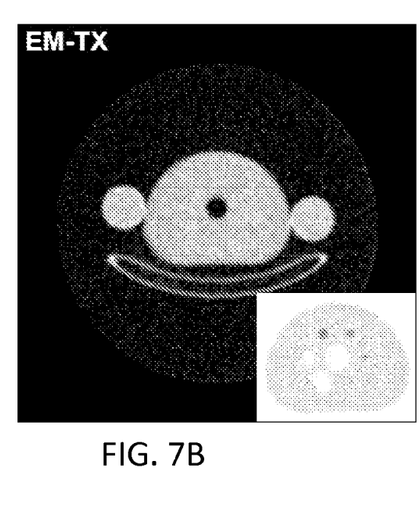
Figure 8A:
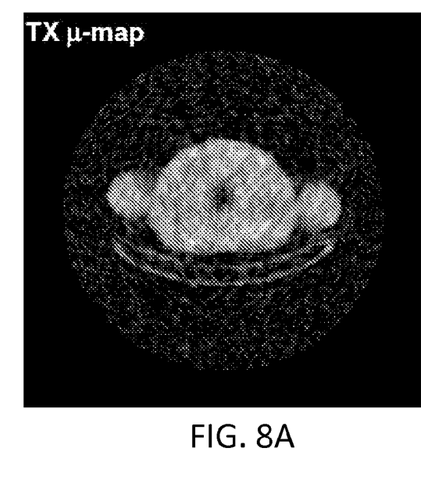
FIGS. 8A and 8B show reconstructions for 3 minute acquisitions.
Figure 8B:
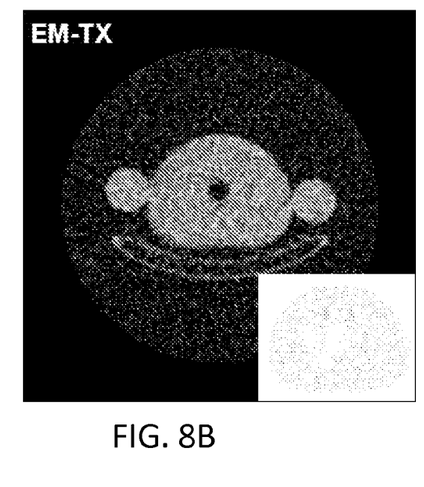

FIGS. 7A and 7B represents similar observations as those in FIGS. 5A and 5B, respectively, for a 30 minute acquisition. This acquisition has a targeted count level of TX data, but the emission count amount was high by an order of magnitude. FIGS. 8A and 8B also presents a similar reconstruction as in FIGS. 5A and 5B, respectively, for a three minute scan. Emission counts are at the level of a typical patient scan. The TX count level was too low. In EM-TX of FIG. 7B, the background reflects noise.

III. Discussion

As shown above, TX imaging benefits from the inclusion of TOF data. In the examples shown above, the TX image noise was reduced and artifacts due to scatter estimation were suppressed. Accordingly, TOF data can be helpful in the reconstruction of CT truncated data. Further, corresponding emission TOF data are not truncated and thus will not likely lead to cross-talk in the attenuation map (complications can be due to errors in EM scatter correction), as in the case of non-TOF data. A related example of a truncated MRI attenuation map image completion can be found in [10].

Figure 9:
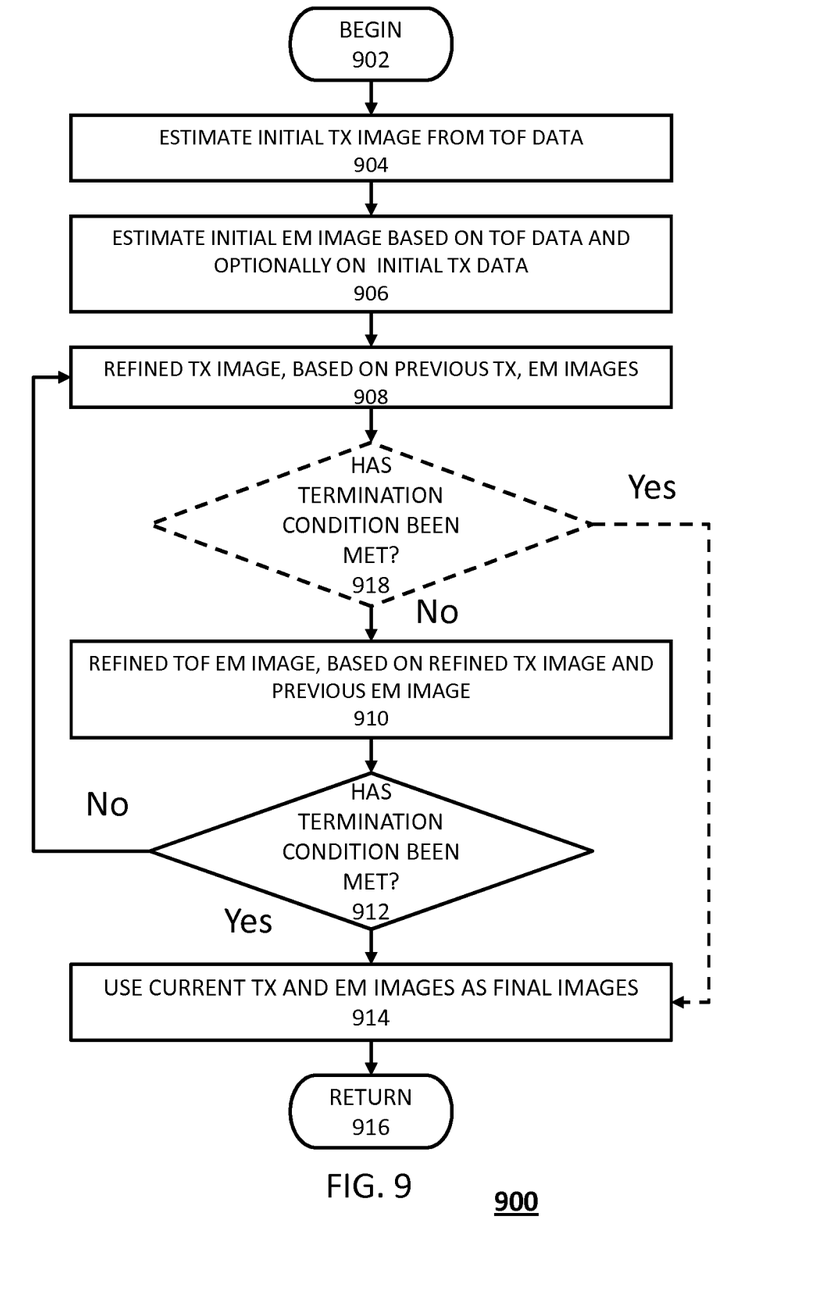
FIG. 9 shows a flowchart of steps in an exemplary method in accordance with the various embodiments.

Now turning to FIG. 9, there is shown an exemplary flowchart of steps in an exemplary method 900 in accordance with the various embodiments. The method 900 begins at step 902 and continues on to step 904. At step 904, an EM-TX reconstruction of the TOF data is performed, as described above, to obtain separated TX data and separated EM data. Before, after, or contemporaneously with step 904, an initial activity image can be estimated at step 906. In the various embodiments, this activity image is not obtained from the separated EM data. Rather, a uniform activity image is selected, as is typical for regular emission data reconstruction.

After the separated TX data is obtained at step 904, an initial attenuation ($\mu$) map can be generated from the separated TX data at step 908. For example, a bilinear interpolation across TOF bins can be used. Additionally, a priori information and TX scatter, estimated also from the separated TX data, can be utilized as well. However, the various embodiments are not limited in this regard and any other methods for computing or estimating the initial attenuation map image from a set of TX data can be used in the various embodiments.

Using the activity image obtained at step 906 and the attenuation map image obtained at step 908, these images can then be refined iteratively, starting at step 910. First, the activity image can be refined or updated at step 910, based on the current attenuation map image. This activity image update step can be described using a generalized form of the optimization discussed above with respect to equation (4). In particular, a nested iteration loop can be provided:

$$f_j^{(n,0)} = f_j^{(n-1)} \quad (10)$$

$$A_i^{(n-1)} = e^{-\sum_j C_{ij}\mu_j^{(n-1)}},$$

$$\bar{b}_{i,t}^{EM} = \bar{r}_i + N_i^{-1}\bar{s}_{i,t}(f) + \bar{s}_{i,t}(B) + B_{i,t}A_i^{(n-1)}.$$

$$f_j^{(n,k)} = f_j^{(n,k-1)} \frac{\sum_{i,t} C_{ij,t} \frac{p_{i,t}}{\sum_{j'} C_{ij',t}f_{j'}^{(n,k-1)} + A_i^{(n-1)^{-1}}N_i\bar{b}_{i,t}^{EM}}}{\sum_{i,t} C_{ij,t}A_i^{(n-1)}N_i^{-1}},$$

$$k = 1, \ldots, K_{EM}$$

$$f_j^{(n)} = f_j^{(n-1,K_{EM})}$$

As noted above, the optimization of equation (2) with respect to the activity image, a well known ML-EM algorithm can be used, where the background counts b include both types of scatter and attenuated blank sinograms. In the case of equation (10), the same applies and this optimization can be performed with $K_{EM}$ iterations of the nested iteration loop.

After the refined or updated activity image is obtained at step 910, the updated activity image can be utilized at step 912 to update the attenuation map image. The attenuation map image update step can described using a generalized form of the optimization described above with respect to equation (3). In particular, a nested iteration loop can also be provided:

$$\mu_j^{(n,0)} = \mu_j^{(n-1)} \quad (11)$$

$$A_i^{(n-1)} = e^{-\sum_j C_{ij}\mu_j^{(n-1)}},$$

$$B_{i,t}^{TX} = B_{i,t} + N_i^{-1}\sum_j C_{ij,t}f_j^{(n)},$$

$$\bar{b}_{i,t}^{TX} = \bar{r}_i + N_i^{-1}\bar{s}_{i,t}(f) + \bar{s}_{i,t}(B).$$

$$\mu_j^{(n,k)} = \mu_j^{(n,k-1)} + $$

$$\alpha \frac{\sum_i C_{ij}\left\{\sum_t B_{i,t}^{TX}A_i^{(n-1)}\left(1 - \frac{p_{i,t}}{B_{i,t}^{TX}A_i^{(n-1)} + \bar{b}_{i,t}^{TX}}\right)\right\} - \beta\frac{\partial U(\mu^{(n,k-1)})}{\partial \mu_j}}{D\sum_i C_{ij}\left\{\sum_t \frac{(B_{i,t}^{TX}A_i^{(n-1)})^2}{B_{i,t}^{TX}A_i^{(n-1)} + \bar{b}_{i,t}^{TX}}\right\} + \beta\frac{\partial^2 U(\mu^{(n,k-1)})}{\partial \mu_j^2}},$$

$$k = 1, \ldots, K_{TX}$$

$$\mu_j^{(n)} = \mu_j^{(n,K_{TX})}$$

Here, $\alpha$ is the relaxation parameter to accelerate convergence, and D is the transaxial diameter of the reconstructed image support, $K_{TX}$ is the total number of nested iterations.

Once updated images have been obtained at steps 910 and 912, the method 900 can determine whether additional updates of the activity and attenuation map images are required. Thus, at step 912 the method 900 can determine whether a termination condition has been met. For example, a termination condition can be whether the difference between the refined or updates images and the previous images is less than a pre-defined criteria (i.e., indicating the refinement did not yield at least a pre-defined minimum amount of changes in the attenuation map image, the activity image, or both). Other types of termination conditions are equally suitable in the various embodiments. Accordingly, if the termination condition is met, the method 900 can proceed to step 916. However, if the termination condition has not been met at step 914, the method can proceed to step 914. At step 914, the current activity and attenuation map images can be used to provide the final image. Afterwards, the method can proceed to step 916 and resume previous processing, including repeating method 900.

In the steps discussed above, the termination condition is evaluated after an update of the activity image and the attenuation map image have been obtained. However, in some embodiments, the terminal condition can be evaluated at any time. For example, as shown in FIG. 9, after the updated activity image has been generated at step 910 and prior to updating the EM image at step 912, an additional check for a termination condition can be performed at step 920. If the termination condition is not met at step 920, the method can then proceed to refinement or updating of the attenuation map image at step 912, as previously described. However, if the termination condition is met at step 920, the method 900 instead proceeds to steps 916 and 918, as described above. In such embodiments, the termination conditions evaluated at each of steps 914 and 920 can be the same or different.

As shown above, the activity image update step relies on the previous activity image obtained. However, the various embodiments are not limited in this regard. With respect to the activity image update step, an alternative methodology is to use a uniform activity image in the nested loop:

$$f_j^{(n,0)} = 1 \qquad (12)$$

$$A_i^{(n-1)} = e^{-\sum_j C_{ij}\mu_j^{(n-1)}},$$

$$\bar{b}_{i,t}^{EM} = \bar{r}_i + N_i^{-1}\bar{s}_{i,t}(f) + \bar{s}_{i,t}(B) + B_{i,t}A_i^{(n-1)}.$$

$$f_j^{(n,k)} = f_j^{(n,k-1)} \frac{\sum_{i,t} C_{ij,t} \frac{p_{i,t}}{\sum_{j'} C_{ij',t} f_{j'}^{(n,k-1)} + A_i^{(n-1)^{-1}} N_i \bar{b}_{i,t}^{EM}}}{\sum_{i,t} C_{ij,t} A_i^{(n-1)} N_i^{-1}}$$

$$k = 1, \ldots, K_{EM}$$

$$f_j^{(n)} = f_j^{(n-1,K_{EM})}$$

Basically, this involves setting $f_j^{(n-1)}$ to 1. This allows for the exclusion of noise build up in activity image reconstruction typically observed in conventional activity image reconstruction. In conventional activity image reconstruction, the attenuation map is usually fixed (e.g., obtained from CT scan). Here, a predefined number of iterations can be used starting from the uniform initial condition to obtain the activity image and thus allows the use of an updated attenuation map image. Since the attenuation map reconstruction step described herein uses regularization, this will prevent noise from building up.

Figure 10:
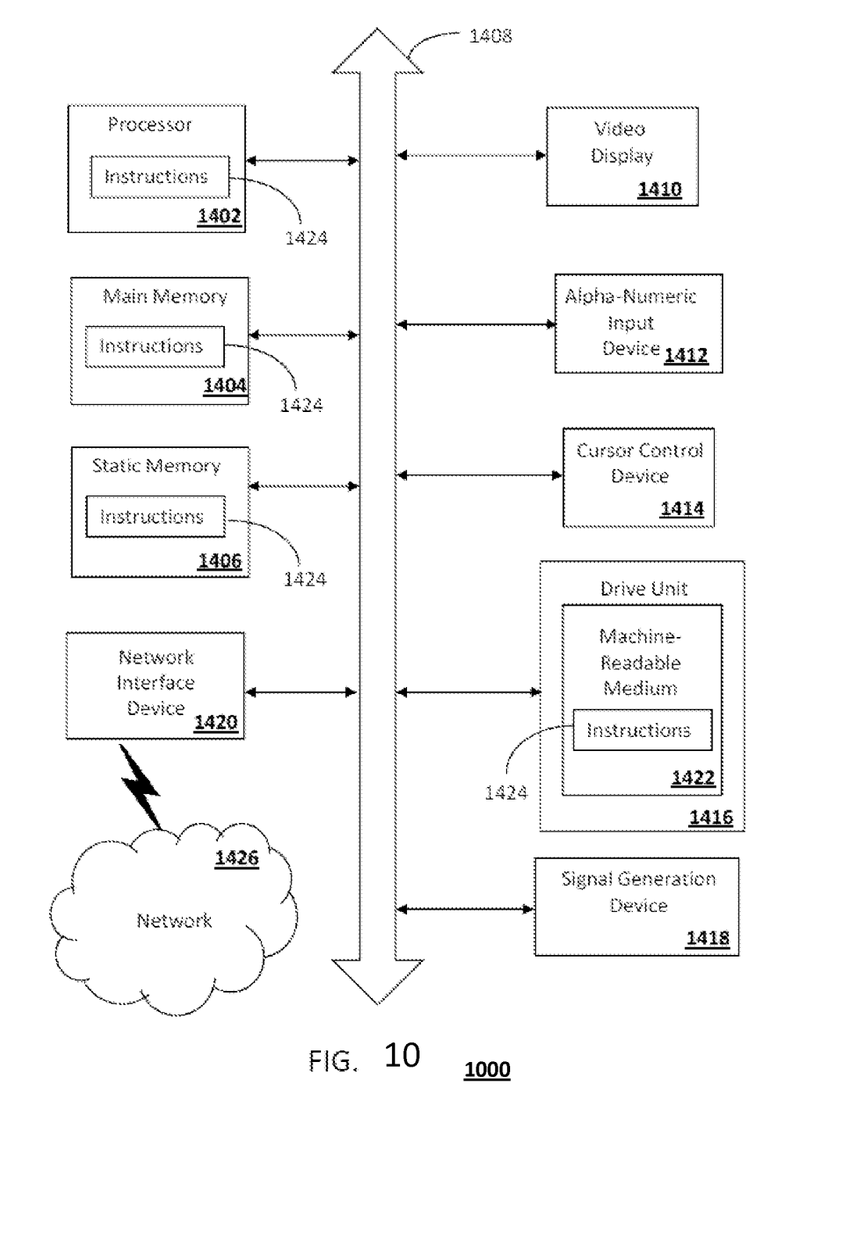
FIG. 10 is a schematic diagram of a computer system for executing a set of instructions that, when executed, can cause the computer system to perform one or more of the methodologies and procedures described herein.

FIG. 10 is a schematic diagram of a computer system 1000 for executing a set of instructions that, when executed, can cause the computer system to perform one or more of the methodologies and procedures described above. In some embodiments, the computer system 1000 operates as a standalone device. In other embodiments, the computer system 1000 can be connected (e.g., using a network) to other computing devices. In a networked deployment, the computer system 1000 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 1000 can include a processor 1002 (such as a central processing unit (CPU), a graphics processing unit (GPU, or both), a main memory 1004 and a static memory 1006, which communicate with each other via a bus 1008. The computer system 1000 can further include a display unit 1010, such as a video display (e.g., a liquid crystal display or LCD), a flat panel, a solid state display, or a cathode ray tube (CRT)). The computer system 1000 can include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 can include a computer-readable storage medium 1022 on which is stored one or more sets of instructions 1024 (e.g., software code) configured to implement one or more of the methodologies, procedures, or functions described herein. The instructions 1024 can also reside, completely or at least partially, within the main memory 1004, the static memory 1006, and/or within the processor 1002 during execution thereof by the computer system 1000. The main memory 1004 and the processor 1002 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 1024 or that receives and executes instructions 1024 from a propagated signal so that a device connected to a network environment 1026 can send or receive voice and/or video data, and that can communicate over the network 1026 using the instructions 1024. The instructions 1024 can further be transmitted or received over a network 1026 via the network interface device 1020.

While the computer-readable storage medium 1022 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for generating images from time of flight (TOF) data associated with a scan of at least one object using a positron emission tomography system, comprising:
providing initial values for an activity image to yield a current activity image;
estimating initial values for an attenuation map ($\mu$-map) image based on the TOF data to yield a current $\mu$-map image;
repeating, until at least one termination condition is met, the steps of:
updating the current activity image based on at least the current $\mu$-map and a first update algorithm, and
updating the current $\mu$-map image based on at least on the updated activity image and a second update algorithm,
outputting an image of the at least one object based on the current $\mu$-map and the current activity image.

2. The method of claim 1, wherein the estimating of the initial values for the $\mu$-map comprises performing a TX data separation of the TOF data to yield non-TOF data and a TX scatter estimation.

3. The method of claim 1, wherein the providing of the initial values for the activity image comprises selecting a uniform activity image.

4. The method of claim 1, wherein the updating of the current $\mu$-map image comprises selecting an update algorithm representing a scaled gradient ascent algorithm.

5. The method of claim 1, wherein the updating of the current $\mu$-map image comprises selecting as the second update algorithm:

$$\mu_j^{(n,0)} = \mu_j^{(n-1)}$$

$$A_i^{(n-1)} = e^{-\sum_j C_{ij}\mu_j^{(n-1)}},$$

$$B_{i,t}^{TX} = B_{i,t} + N_i^{-1}\sum_j C_{ij,t}f_j^{(n)}, \quad \overline{b}_{i,t}^{TX} = \overline{r}_i + N_i^{-1}\overline{s}_{i,t}(f) + \overline{s}_{i,t}(B).$$

$$\mu_j^{(n,k)} = \mu_j^{(n,k-1)} + \alpha \frac{\sum_i C_{ij}\left\{\sum_t B_{i,t}^{TX}A_i^{(n-1)}\left(1 - \frac{p_{i,t}}{B_{i,t}^{TX}A_i^{(n-1)} + \overline{b}_{i,t}^{TX}}\right)\right\} - \beta\frac{\partial U(\mu^{(n,k-1)})}{\partial \mu_j}}{D\sum_i C_{ij}\left\{\sum_t \frac{(B_{i,t}^{TX}A_i^{(n-1)})^2}{B_{i,t}^{TX}A_i^{(n-1)} + \overline{b}_{i,t}^{TX}}\right\} + \beta\frac{\partial^2 U(\mu^{(n,k-1)})}{\partial \mu_j^2}},$$

$$k = 1, \ldots, K_{TX}$$

$$\mu_j^{(n)} = \mu_j^{(n,K_{TX})}$$

where μ is the attenuation coefficient distribution and f is the object emission activity image, indentified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, $\overline{s}$ is scatter contribution, and α is a relaxation parameter.

6. The method of claim 1, wherein updating the current activity image selecting as the first update equation:

$$f_j^{(n,0)} = f_j^{(n-1)}$$

$$A_i^{(n-1)} = e^{-\sum_j C_{ij}\mu_j^{(n-1)}},$$

$$\overline{b}_{i,t}^{EM} = \overline{r}_i + N_i^{-1}\overline{s}_{i,t}(f) + \overline{s}_{i,t}(B) + B_{i,t}A_i^{(n-1)}.$$

$$f_j^{(n,k)} = f_j^{(n,k-1)}\frac{\sum_{i,t} C_{ij,t}\frac{p_{i,t}}{\sum_{j'} C_{ij',t}f_{j'}^{(n,k-1)} + A_i^{(n-1)^{-1}}N_i\overline{b}_{i,t}^{EM}}}{\sum_{i,t} C_{ij,t}A_i^{(n-1)}N_i^{-1}},$$

$$k = 1, \ldots, K_{EM}$$

$$f_j^{(n)} = f_j^{(n-1,K_{EM})}$$

where μ is the attenuation coefficient distribution and f is the object emission activity image, indentified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, and $\overline{s}$ is scatter contribution.

7. The method of claim 1, the step of repeating further comprising:
evaluating, for at least one of the current μ-map image and the current activity image, a difference between a current version and an updated version;
if the difference for at least one of the current μ-map image and the current activity image meets a predefined termination criteria, determining that the termination condition has been met.

8. A system for generating images from time of flight (TOF) data associated with a scan of at least one object using a positron emission tomography system, comprising:
a processor; and
a computer-readable medium having stored thereon instructions for causing the processor to perform the steps of:
providing initial values for an activity image to yield a current activity image;
estimating initial values for an attenuation map (μ-map) image based on the TOF data to yield a current μ-map image;
repeating, until at least one termination condition is met, the steps of:
updating the current activity image based on at least the current μ-map and a first update algorithm, and
updating the current μ-map image based on at least on the updated activity image and a second update algorithm,
outputting an image of the at least one object based on the current μ-map and the current activity image.

9. The system of claim 8, wherein the instructions for the estimating the initial values for the μ-map further comprise instructions for performing a TX data separation of the TOF data to yield non-TOF data and a TX scatter estimation.

10. The system of claim 8, wherein the instructions for the providing of the initial values for the activity image further comprise instructions for selecting a uniform activity image.

11. The system of claim 8, wherein the instructions for the updating of the current μ-map image further comprise instructions for selecting an update algorithm representing a scaled gradient ascent algorithm.

12. The system of claim 8, wherein the instructions for the updating of the current μ-map image further comprise instructions for implementing the second update algorithm using:

$$\mu_j^{(n,0)} = \mu_j^{(n-1)}$$

$$A_i^{(n-1)} = e^{-\sum_j C_{ij}\mu_j^{(n-1)}},$$

$$B_{i,t}^{TX} = B_{i,t} + N_i^{-1}\sum_j C_{ij,t}f_j^{(n)}, \quad \overline{b}_{i,t}^{TX} = \overline{r}_i + N_i^{-1}\overline{s}_{i,t}(f) + \overline{s}_{i,t}(B).$$

$$\mu_j^{(n,k)} = \mu_j^{(n,k-1)} + \alpha \frac{\sum_i C_{ij}\left\{\sum_t B_{i,t}^{TX}A_i^{(n-1)}\left(1 - \frac{p_{i,t}}{B_{i,t}^{TX}A_i^{(n-1)} + \overline{b}_{i,t}^{TX}}\right)\right\} - \beta\frac{\partial U(\mu^{(n,k-1)})}{\partial \mu_j}}{D\sum_i C_{ij}\left\{\sum_t \frac{(B_{i,t}^{TX}A_i^{(n-1)})^2}{B_{i,t}^{TX}A_i^{(n-1)} + \overline{b}_{i,t}^{TX}}\right\} + \beta\frac{\partial^2 U(\mu^{(n,k-1)})}{\partial \mu_j^2}},$$

$$k = 1, \ldots, K_{TX}$$

$$\mu_j^{(n)} = \mu_j^{(n,K_{TX})}$$

where μ is the attenuation coefficient distribution and f is the object emission activity image, identified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, $\overline{s}$ is scatter contribution, and α is a relaxation parameter.

13. The system of claim 8, wherein the instructions for the updating of the current activity image further comprise instructions for implementing the first update algorithm using:

$$f_j^{(n,0)} = f_j^{(n-1)}$$
$$A_i^{(n-1)} = e^{-\sum_j C_{ij}\mu_j^{(n-1)}},$$
$$\overline{b}_{i,t}^{EM} = \overline{r}_i + N_i^{-1}\overline{s}_{i,t}(f) + \overline{s}_{i,t}(B) + B_{i,t}A_i^{(n-1)}.$$

$$f_j^{(n,k)} = f_j^{(n,k-1)} \frac{\sum_{i,t} C_{ij,t} \frac{p_{i,t}}{\sum_{j'} C_{ij',t}f_{j'}^{(n,k-1)} + A_i^{(n-1)^{-1}} N_i \overline{b}_{i,t}^{EM}}}{\sum_{i,t} C_{ij,t} A_i^{(n-1)} N_i^{-1}},$$

$$k = 1, \ldots, K_{EM}$$
$$f_j^{(n)} = f_j^{(n-1,K_{EM})}$$

where μ is the attenuation coefficient distribution and f is the object emission activity image, indentified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, and $\overline{s}$ is scatter contribution.

14. The system of claim 8, the steps further comprising:

evaluating, for at least one of the current μ-map image and the current activity image, a difference between a current version and an updated version;

if the difference for at least one of the current μ-map image and the current activity image meets a predefined termination criteria, determining that the termination condition has been met.

15. A non-transitory computer-readable medium having stored thereon a computer program with a plurality of instructions for causing a computing device to perform the method comprising:

providing initial values for an activity image to yield a current activity image;

estimating initial values for an attenuation map (μ-map) image based on the TOF data to yield a current μ-map image;

repeating, until at least one termination condition is met, the steps of:

updating the current activity image based on at least the current μ-map and a first update algorithm, and updating the current μ-map image based on at least on the updated activity image and a second update algorithm, outputting an image of the at least one object based on the current μ-map and the current activity image.

16. The non-transitory computer-readable medium of claim 15, wherein determining the initial values for the μ-map comprises performing a TX data separation of the TOF data to yield non-TOF data and a TX scatter estimation.

17. The non-transitory computer-readable medium of claim 15, wherein the updating of the current μ-map image comprises selecting an update algorithm representing a scaled gradient ascent algorithm.

18. The non-transitory computer-readable medium of claim 15, wherein the updating of the current μ-map image comprises selecting as the second update algorithm:

$$\mu_j^{(n,0)} = \mu_j^{(n-1)}$$
$$A_i^{(n-1)} = e^{-\sum_j C_{ij}\mu_j^{(n-1)}},$$
$$B_{i,t}^{TX} = B_{i,t} + N_i^{-1}\sum_j C_{ij,t}f_j^{(n)}, \quad \overline{b}_{i,t}^{TX} = \overline{r}_i + N_i^{-1}\overline{s}_{i,t}(f) + \overline{s}_{i,t}(B).$$

$$\mu_j^{(n,k)} = \mu_j^{(n,k-1)} + \alpha \frac{\sum_i C_{ij}\left\{\sum_t B_{i,t}^{TX} A_i^{(n-1)}\left(1 - \frac{p_{i,t}}{B_{i,t}^{TX} A_i^{(n-1)} + \overline{b}_{i,t}^{TX}}\right)\right\} - \beta\frac{\partial U(\mu^{(n,k-1)})}{\partial \mu_j}}{D\sum_i C_{ij}\left\{\sum_t \frac{(B_{i,t}^{TX} A_i^{(n-1)})^2}{B_{i,t}^{TX} A_i^{(n-1)} + \overline{b}_{i,t}^{TX}}\right\} + \beta\frac{\partial^2 U(\mu^{(n,k-1)})}{\partial \mu_j^2}},$$

$$k = 1, \ldots, K_{TX}$$
$$\mu_j^{(n)} = \mu_j^{(n,K_{TX})}$$

where μ is the attenuation coefficient distribution and f is the object emission activity image, indentified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, $\overline{s}$ is scatter contribution, and α is a relaxation parameter.

19. The non-transitory computer-readable medium of claim 15, wherein updating the current activity image selecting as the first update equation:

$$f_j^{(n,0)} = f_j^{(n-1)}$$
$$A_i^{(n-1)} = e^{-\sum_j C_{ij}\mu_j^{(n-1)}},$$
$$\overline{b}_{i,t}^{EM} = \overline{r}_i + N_i^{-1}\overline{s}_{i,t}(f) + \overline{s}_{i,t}(B) + B_{i,t}A_i^{(n-1)}.$$

$$f_j^{(n,k)} = f_j^{(n,k-1)} \frac{\sum_{i,t} C_{ij,t} \frac{p_{i,t}}{\sum_{j'} C_{ij',t}f_{j'}^{(n,k-1)} + A_i^{(n-1)^{-1}} N_i \overline{b}_{i,t}^{EM}}}{\sum_{i,t} C_{ij,t} A_i^{(n-1)} N_i^{-1}},$$

$$k = 1, \ldots, K_{EM}$$
$$f_j^{(n)} = f_j^{(n-1,K_{EM})}$$

where μ is the attenuation coefficient distribution and f is the object emission activity image, indentified at image voxel with index j, B is blank projection data, $C_{ij}$ and $C_{ij,t}$ are system matrices of non-TOF and TOF line-integral projectors, $\overline{r}$ is mean random counts, N is a normalization coefficient array, and $\overline{s}$ is scatter contribution.

20. The non-transitory computer-readable medium of claim 15, the step of repeating further comprising:

evaluating, for at least one of the current μ-map image and the current activity image, a difference between a current version and an updated version;

if the difference for at least one of the current μ-map image and the current activity image meets a predefined termination criteria, determining that the termination condition has been met.

\* \* \* \* \*